(12) United States Patent
Lock et al.

(10) Patent No.: US 9,545,882 B2
(45) Date of Patent: Jan. 17, 2017

(54) REARVIEW DEVICE WITH EXPOSED CARRIER PLATE

(71) Applicant: Gentex Corporation, Zeeland, MI (US)

(72) Inventors: Nigel T. Lock, Holland, MI (US); Mark R. Roth, Grand Rapids, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/707,148

(22) Filed: May 8, 2015

(65) Prior Publication Data

US 2015/0321611 A1 Nov. 12, 2015

Related U.S. Application Data

(60) Provisional application No. 61/990,480, filed on May 8, 2014.

(51) Int. Cl.
| | |
|---|---|
| *G02F 1/153* | (2006.01) |
| *B60R 1/04* | (2006.01) |
| *B60R 1/08* | (2006.01) |
| *G02F 1/157* | (2006.01) |

(52) U.S. Cl.
CPC .............. *B60R 1/04* (2013.01); *B60R 1/088* (2013.01); *G02F 1/157* (2013.01); *G02F 1/1533* (2013.01)

(58) Field of Classification Search
CPC ............ B60R 1/088; B60R 1/04; G02F 1/157; G02F 1/1533
USPC ................. 359/245, 265–275, 601–603, 838, 839,359/868, 871; 362/494; 345/105
See application file for complete search history.

(56) References Cited

U.S. PATENT DOCUMENTS

| | | | | |
|---|---|---|---|---|
| 5,649,756 | A | * | 7/1997 | Adams ................... B60Q 3/023 362/488 |
| 8,638,488 | B2 | | 1/2014 | Tonar et al. |
| 8,730,553 | B2 | * | 5/2014 | De Wind .................. B60R 1/04 359/245 |
| 9,174,578 | B2 | * | 11/2015 | Uken ....................... B60R 1/088 |
| 2010/0033857 | A1 | | 2/2010 | Filipiak |

FOREIGN PATENT DOCUMENTS

EP 1024051 A2 8/2000

OTHER PUBLICATIONS

International Searching Authority, International Search Report and Written Opinion for International Application No. PCT/US2015/029904, Jul. 16, 2015, 8 pages.

\* cited by examiner

*Primary Examiner* — Tuyen Tra
(74) *Attorney, Agent, or Firm* — Price Heneveld LLP; Bradley D. Johnson

(57) ABSTRACT

A rearview device having a front element defining a first surface and a second surface. A rear element defines a third surface and a fourth surface. An electro-optic material is located between the front element and the rear element. A carrier plate includes a front side, a back side, and a peripheral wall. The front side is disposed proximate the fourth surface and the peripheral wall is operably coupled with a peripheral edge of the second surface. A device housing is operably coupled to the back side of the carrier plate. The peripheral wall and a portion of the back side of the carrier plate extend beyond the device housing and are externally exposed.

19 Claims, 5 Drawing Sheets

REARVIEW DEVICE WITH EXPOSED CARRIER PLATE

CROSS-REFERENCE TO RELATED APPLICATION

This application claims priority to and the benefit under 37 U.S.C. §119(e) of U.S. Provisional Application No. 61/990,480, filed on May 8, 2014, entitled "REARVIEW DEVICE WITH EXPOSED CARRIER PLATE," the disclosure of which is hereby incorporated herein by reference in its entirety.

BACKGROUND OF THE DISCLOSURE

The present disclosure generally relates to a rearview device, and more particularly to a rearview device with an exposed carrier plate for a vehicle.

SUMMARY OF THE PRESENT DISCLOSURE

One aspect of the present disclosure includes a rearview device having a front element defining a first surface and a second surface. A rear element defines a third surface and a fourth surface. An electro-optic material is located between the front element and the rear element. A carrier plate includes a front side, a back side, and a peripheral wall. The front side is disposed proximate the fourth surface and the peripheral wall is operably coupled with a peripheral edge of the second surface. A device housing is operably coupled to the back side of the carrier plate. The peripheral wall and a portion of the back side of the carrier plate extend beyond the device housing and are externally exposed.

Another aspect of the present disclosure includes a rearview device having a display device that includes a peripheral edge. A carrier plate includes a back side and a peripheral wall. The peripheral wall is operably coupled with the peripheral edge of the display device and is generally flush therewith to create a smooth transition from the peripheral edge of the display device to the peripheral wall of the carrier plate. A device housing is proximate the back side of the carrier plate. The peripheral wall and a portion of the back side of the carrier plate extend beyond the device housing and are externally exposed. An engagement wall extends generally orthogonal to the back side of the peripheral wall and operably couples the carrier plate with the device housing.

Yet another aspect of the present disclosure includes a rearview device having a display device that includes a peripheral edge. A carrier plate includes a back side and a peripheral wall. The peripheral wall is operably coupled with the peripheral edge and is generally flush therewith to create a generally smooth transition from the peripheral edge of the display device to the peripheral wall of the carrier plate. A device housing is operably coupled to the back side of the carrier plate. The peripheral wall and a portion of the back side of the carrier plate extend beyond the device housing and are externally exposed.

Still yet another aspect of the present disclosure includes a rearview device having a display device that includes a peripheral edge. A carrier plate includes a back side and a peripheral wall. The peripheral wall is operably coupled with the peripheral edge and is generally flush therewith to create a generally smooth transition from the peripheral edge of the display device to the peripheral wall of the carrier plate. A device housing is operably coupled to the back side of the carrier plate. The peripheral wall and a portion of the back side of the carrier plate extend beyond the device housing and are externally exposed. A seal may be disposed between the carrier plate and a front element.

These and other aspects, objects, and features of the present disclosure will be understood and appreciated by those skilled in the art upon studying the following specification, claims, and appended drawings.

DETAILED DESCRIPTION OF EMBODIMENTS

Figure 1:
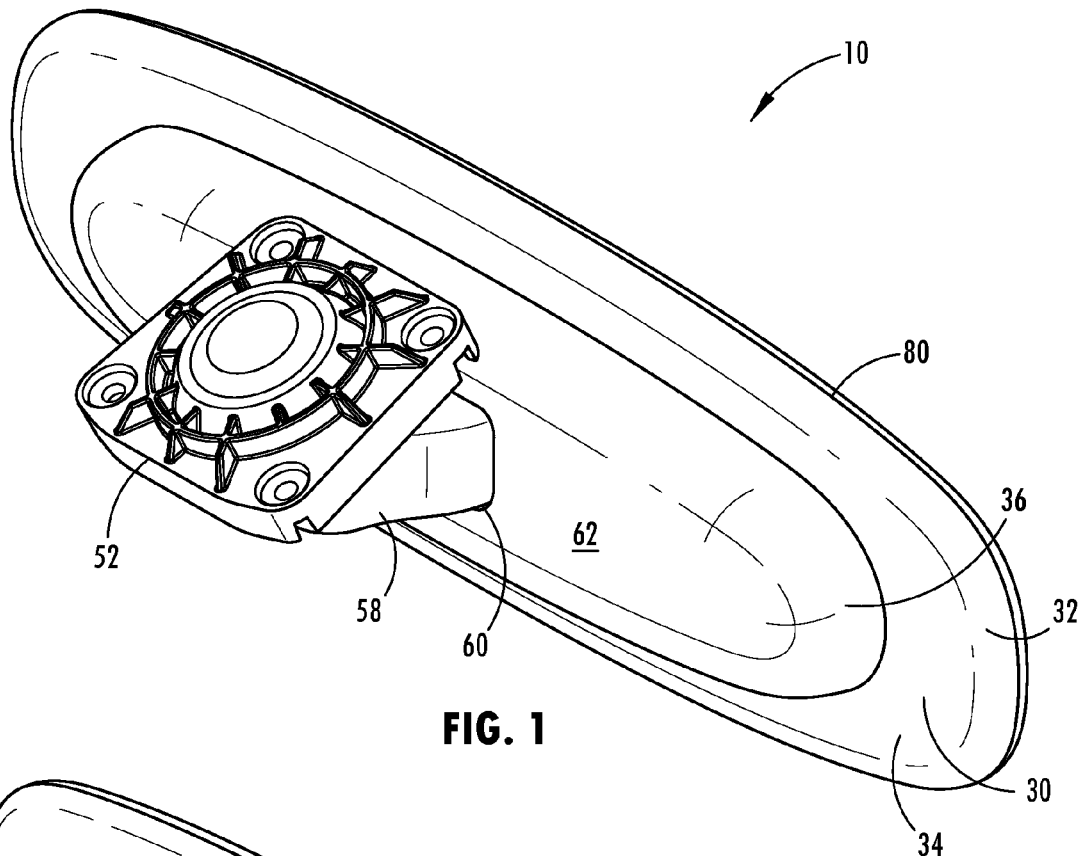
FIG. 1 is a top rear perspective view of a rearview device for a vehicle of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, reference numeral 10 generally designates a rearview device having a front element 12 defining a first surface 14 and a second surface 16. A rear element 18 defines a third surface 20 and a fourth surface 22.

An electro-optic material 24, such as an electrochromic material, is located between the front element 12 and the rear element 18. A carrier plate 26 includes a front side 28, a back side 30, and a peripheral wall 32. The front side 28 is disposed proximate the fourth surface 22. A device housing 36 is operably coupled to the back side 30 of the carrier plate 26. The peripheral wall 32 and an outer portion 38 of the back side 30 of the carrier plate 26 extend beyond the device housing 36 and are externally exposed.

Figure 2:
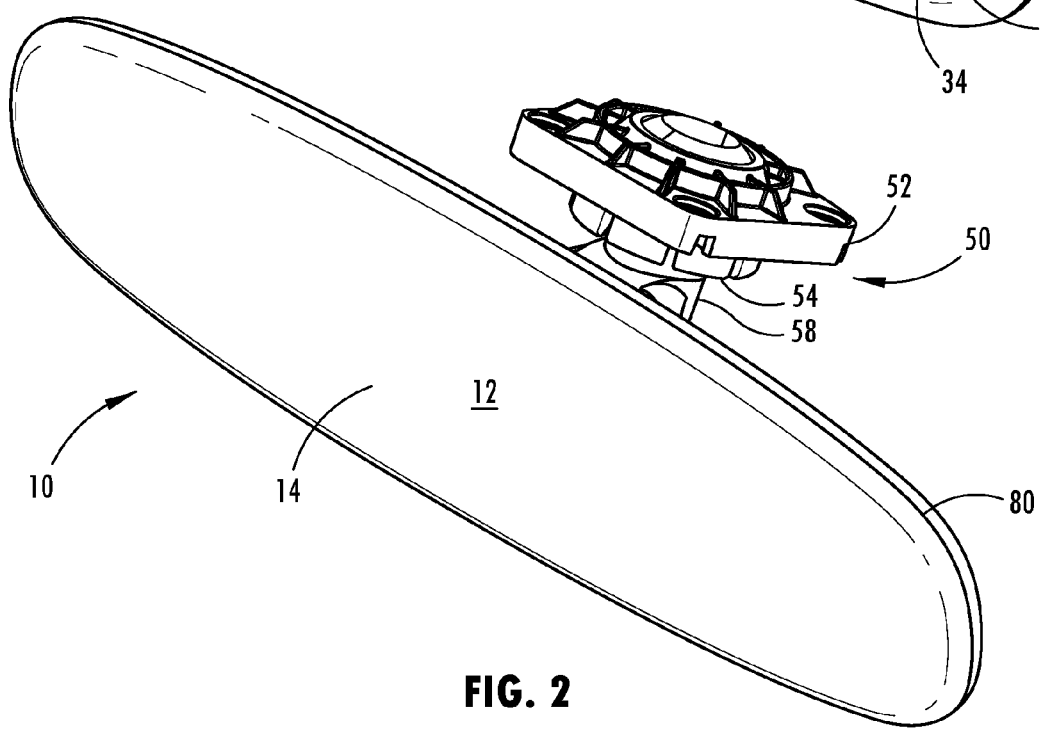
FIG. 2 is a top front perspective view of the rearview device of FIG. 1.
Figure 3:
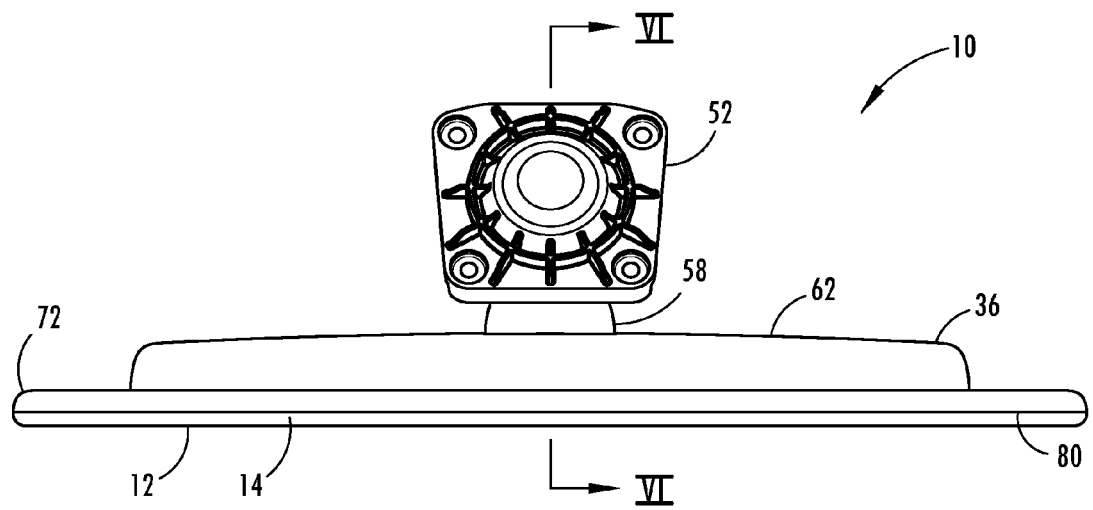
FIG. 3 is a top plan view of the rearview device of FIG. 1.
Figure 4:
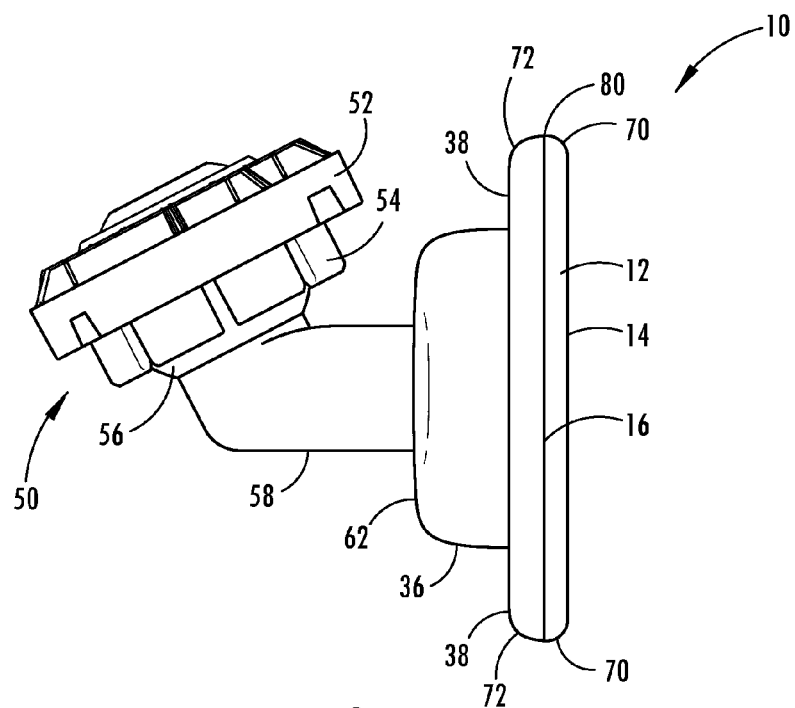
FIG. 4 is a side elevational view of the rearview device of FIG. 1.

With reference to FIGS. 1 and 2, the rearview device 10 is generally configured for installation on a front windshield of a vehicle. The rearview device 10 includes a mount 50 configured for engagement with the inside surface of the windshield. The mount 50 includes a windshield connector 52 defining a socket 54 configured to engage a ball 56 (FIG. 4) of a device support 58. Notably, the ball 56 and socket 54 can be disposed inside or outside of the device housing 36. The mount 50 provides for a range of movement of the rearview device 10 relative to the windshield. Further, it is also contemplated that the mount 50 can be operably coupled with the back side 30 of the carrier plate 26 inside the device housing 36. The socket 54 may be similar to that set forth in U.S. Patent Application Publication No. 2014/0097320, entitled "REARVIEW MOUNTING DEVICE," the disclosure of which is hereby incorporated herein by reference in its entirety. The device support 58 extends into and is received by a recess 60 defined in a rear portion 62 of the device housing 36 and provides one or more of an electrical, mechanical, and data connection to the rearview device 10. Notably, the height and width of the device housing 36 is considerably smaller than the height and width of the carrier plate 26, the front element 12, and the rear element 18. As a result, the device housing 36 mounts to the back side 30 of the carrier plate 26. More specifically, the device housing 36 mounts to a fastening arrangement in the form of an engagement wall 66 extending from the back side 30 of the carrier plate 26. The fastening arrangement is disposed on an inside surface of the device housing 36. Accordingly, the outer portion 38 of the back side 30 of the carrier plate 26 is left exposed. The outer portion 38 of the carrier plate 26 may include a similar or dissimilar texture and color to the device housing 36. As illustrated in FIGS. 1, 3, and 4, the carrier plate 26 extends past the device housing 36 approximately one inch.

Figure 5:
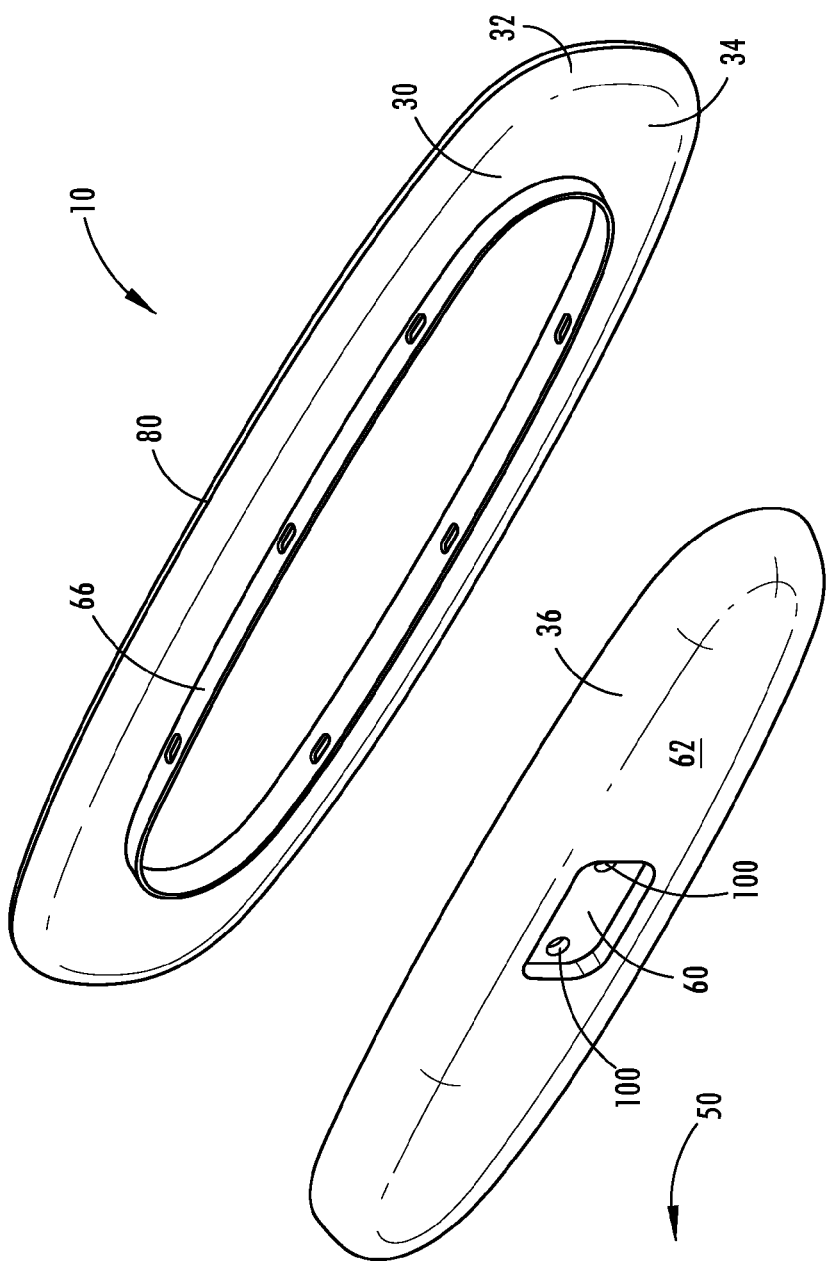
FIG. 5 is a top perspective exploded view of FIG. 1.
Figure 5:
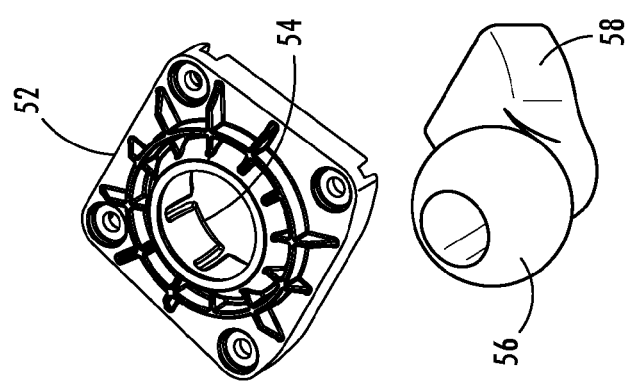

With reference to FIG. 5, the rearwardly extending engagement wall 66 of the carrier plate 26 is configured for mechanical attachment with the device housing 36. The device housing 36 is generally configured to house, support, and protect electrical components, including at least one circuit board. The device housing 36 is slightly tapered and configured for engagement with the engagement wall 66 disposed on the back side 30 of the carrier plate 26. It is generally contemplated that the engagement wall 66 may engage an inside of the device housing 36 or an outside of the device housing 36 during assembly. It is also contemplated that the carrier plate 26 could be integrally formed or molded with the device housing 36 as a single piece.

Figure 6:
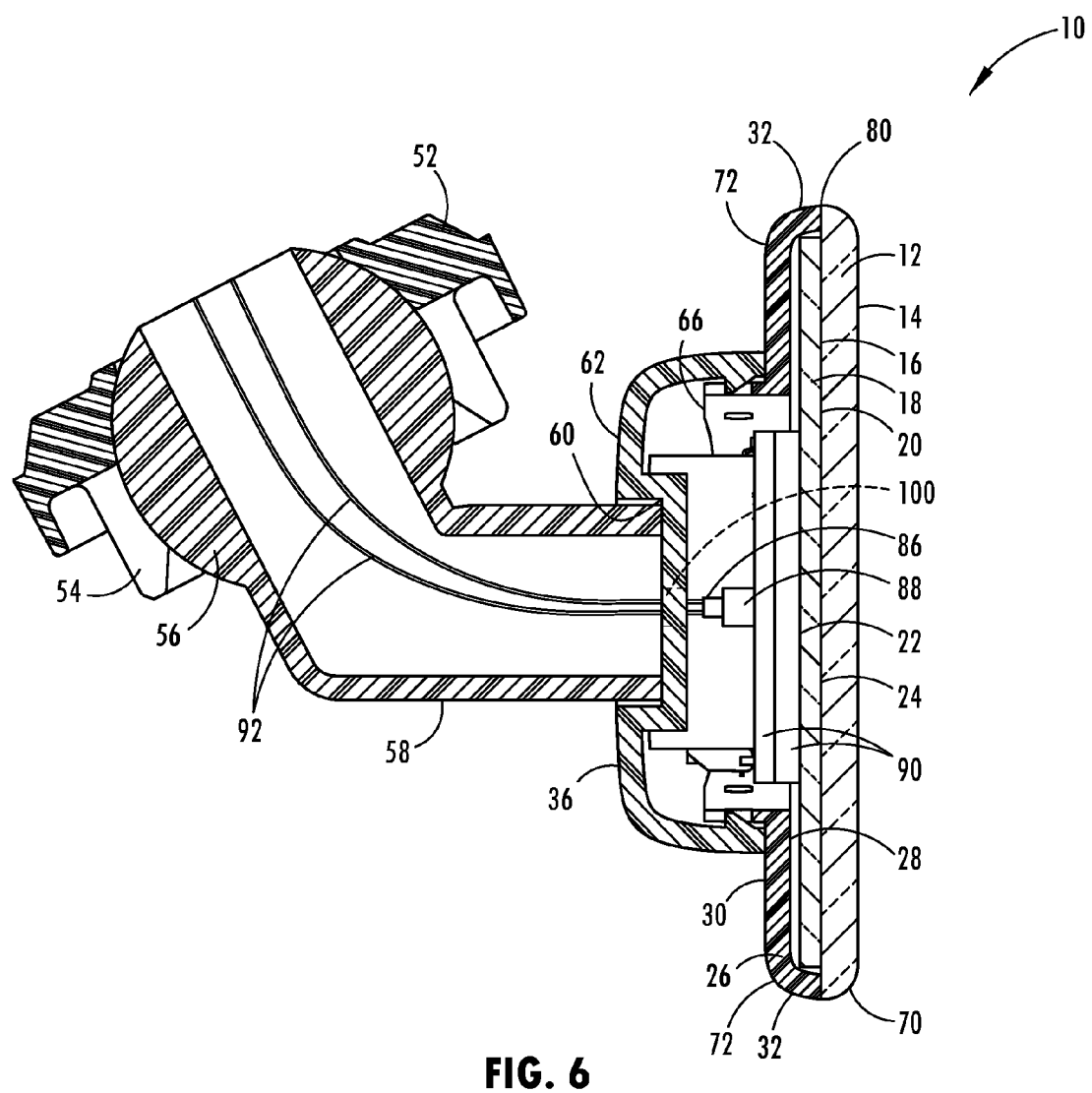
FIG. 6 is an enlarged cross-sectional view of FIG. 1.

As shown in FIGS. 1 and 6, the front element 12 is exposed while the rear element 18 is positioned behind the front element 12. The front element 12 has a greater height and width than the rear element 18 and also includes a rounded front edge 70. The rounded front edge 70 provides a smooth and aesthetically pleasing look to the rearview device 10. Similarly, the carrier plate 26 includes a rounded rear transition portion 72 similar to the rounded front edge 70 of the front element 12. As illustrated in FIG. 6, the carrier plate 26 wraps around the rear element 18 and abuts the second surface 16 of the front element 12. This construction provides a uniform and smooth transition from the carrier plate 26 to the front element 12 and encloses the rear element 18 and also conceals the rear element 18 from view. Alternatively, the carrier plate 26 can abut the fourth surface 22 of the rear element 18. In this instance, a periphery of the rear element 18 may be exposed. It is also contemplated that a seal 80 may be disposed between the carrier plate 26 and the front element 12 that maintains the front element 12 and the carrier plate 26 coupled.

With reference again to FIGS. 5 and 6, the rounded front edge 70 of the front element 12 may be molded, ground, or otherwise formed on the peripheral front edge of the front element 12. It is generally contemplated that the radius of curvature of the front element 12 may mimic or otherwise be similar to the rounded rear transition portion 72 between the peripheral wall 32 and the back side 30 of the carrier plate 26. Accordingly, a consistent feel between the front element 12 and the carrier plate 26 is provided to a user adjusting the rearview device 10. However, it is also contemplated that the carrier plate 26 and the front element 12 may include different peripheral constructions. For example, the peripheral wall 32 of the carrier plate 26 may include a transition portion having an angled wall rather than a rounded wall. Further, a knurled or otherwise rough surface may be formed on the peripheral wall 32 that assists a user in grasping the rearview device 10 and adjusting the same prior to or during travel. The rounded front edge 70 of the front element 12 may be smooth, frosted, etc. to complement the feel and appearance of the carrier plate 26.

With reference once again to FIGS. 5 and 6, it is generally contemplated that the rear element 18 will be spaced a predetermined distance from an inside surface of the carrier plate 26. However, it is also contemplated that the rear element 18 may be in abutting contact with the inside surface of the carrier plate 26 at the peripheral wall 32. Such construction may aid in properly locating the carrier plate 26 during manufacturing. In addition, it is contemplated that male and female adapters 86, 88 may operably couple circuit boards 90 with the vehicle. In an embodiment, the male adapter 86 disposed on the ends of wires 92 is coupled with the female adapter 88 on the circuit boards 90. The wires 92 extend through the device housing 36 and the mount 50 and ultimately to a control center, such as a vehicle controller area network (CAN) bus. Additionally, as illustrated in FIG. 5, the engagement wall 66 is integral with the carrier plate 26 and extends rearwardly therefrom at a generally orthogonal angle thereto. However, it should also be understood that the engagement wall 66 may extend in a variety of other angles from the carrier plate 26. Alternatively, the engagement wall 66 may extend from the device housing 36 into secure engagement with slots defined on the back side 30 of the carrier plate 26. It is contemplated that the engagement wall 66 may extend around all, substantially all, or some of the inside surface of the device housing 36.

It is contemplated that the device housing 36 and the carrier plate 26 may be generally opaque, translucent, or transparent. Regardless, it is generally contemplated that a majority of the electrical components used to operate the rearview device 10 are disposed within the device housing 36 and behind the rear element 18 of the rearview device 10 after assembly. The recess 60 in the device housing 36 may include at least one aperture 100 configured to relay power and/or data lines therethrough to the circuits boards disposed in the device housing 36. It is contemplated that the data and/or power lines will extend from the circuit boards 90 through the apertures defined in the recess 60 and ultimately through the device support 58 and ball 56 of the mount 50.

Figure 7:
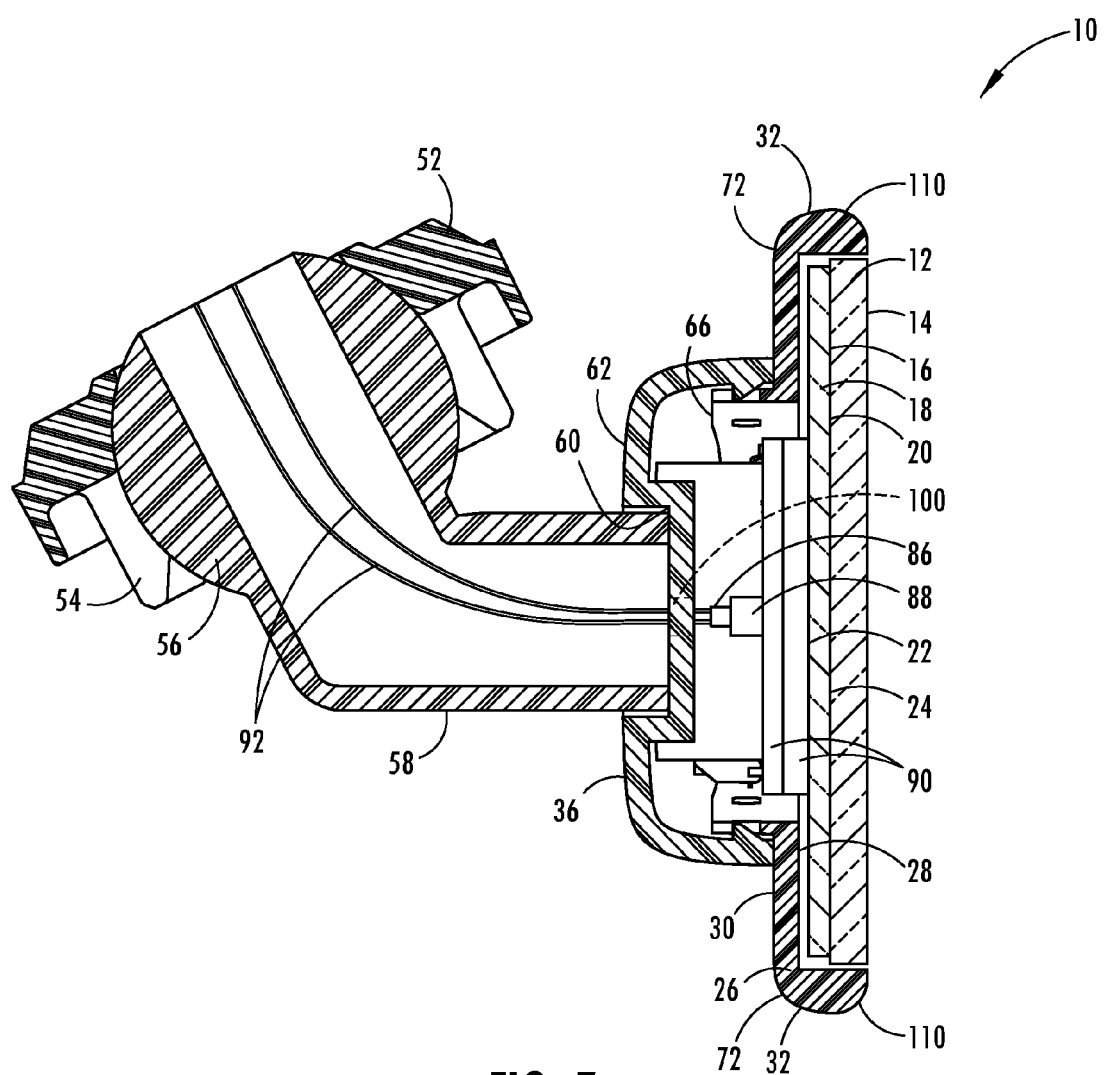
FIG. 7 is an enlarged cross-sectional view of a rearview device with enlarged peripheral walls.

Referring now to FIG. 7, it is also contemplated that the carrier plate 26 may be configured to extend forward past the second surface 16 of the front element 12. In the illustrated embodiment, the carrier plate 26 includes a framed ring design. In this instance, a peripheral hiding layer, for example a chrome ring, is positioned on the second surface 16 to hide electrical contacts in communication with the electro-optic material 24 disposed between the front element 12 and the rear element 18. The peripheral walls 32 of the carrier plate 26 include a forward rounded portion 110 that round to a forward, inward edge that is flush with, or nearly flush with, the first surface 14 of the front element 12. In this instance, the rear element 18 is generally concealed between the carrier plate 26 and the front element 12. Additionally, the peripheral wall 32 of the carrier plate 26 conceals the peripheral edge of both the front element 12 and the rear element 18.

The present disclosure may be used with a rearview assembly such as that described in U.S. Pat. Nos. 8,925,891; 8,814,373; 8,201,800; and 8,210,695; U.S. Patent Application Publication Nos. 2014/0063630 and 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview device comprising:
   a front element defining a first surface and a second surface;
   a rear element defining a third surface and a fourth surface;
   an electro-optic material located between the front element and the rear element;
   a carrier plate including a front side, a back side, and a peripheral wall, wherein the front side is disposed proximate the fourth surface and the peripheral wall is operably coupled with a peripheral edge of the second surface; and
   a device housing operably coupled to the back side of the carrier plate, wherein the peripheral wall and a portion of the back side of the carrier plate extend beyond the device housing and are externally exposed.

2. The rearview device of claim 1, wherein the peripheral wall of the carrier plate abuts the second surface of the front element and conceals a peripheral edge of the rear element.

3. The rearview device of claim 1, further comprising:
   a device support operably coupled with a rear portion of the device housing.

4. The rearview device of claim 3, wherein the device housing includes a recess therein configured to receive the device support.

5. The rearview device of claim 1, further comprising:
   an engagement wall extending generally orthogonal to the back side of the peripheral wall and operably coupling the carrier plate with the device housing.

6. The rearview device of claim 1, wherein the front element includes a rounded front edge.

7. The rearview device of claim 1, further comprising:
   a rounded transition portion disposed between the peripheral wall and the back side of the carrier plate.

8. A rearview device comprising:
   a display device including a peripheral edge;
   a carrier plate including a back side and a peripheral wall, wherein the peripheral wall is operably coupled with the peripheral edge of the display device and generally flush therewith to create a smooth transition from the peripheral edge of the display device to the peripheral wall of the carrier plate;

a device housing proximate the back side of the carrier plate, wherein the peripheral wall and a portion of the back side of the carrier plate extend beyond the device housing and are externally exposed; and an engagement wall extending generally orthogonal to the back side of the peripheral wall and operably coupling the carrier plate with the device housing.

9. The rearview device of claim 8, further comprising:
a device support operably coupled with a rear portion of the device housing.

10. The rearview device of claim 9, wherein the device housing includes a recess therein configured to receive the device support.

11. The rearview device of claim 10, wherein the recess defines at least one aperture configured to relay data to a circuit board disposed in the device support.

12. The rearview device of claim 8, wherein the engagement wall is integral with and extends rearwardly from the carrier plate with the device housing.

13. The rearview device of claim 12, wherein the engagement wall is configured to engage a fastening arrangement disposed on an inside surface of the device housing.

14. The rearview device of claim 8, further comprising:
a front element including a rounded front edge.

15. The rearview device of claim 8, further comprising:
a rounded transition portion disposed between the peripheral wall and the back side of the carrier plate.

16. A rearview device comprising:
a display device including a peripheral edge;
a carrier plate including a back side and a peripheral wall, wherein the peripheral wall is operably coupled with the peripheral edge and generally flush therewith to create a generally smooth transition from the peripheral edge of the display device to the peripheral wall of the carrier plate;
a device housing operably coupled to the back side of the carrier plate, wherein the peripheral wall and a portion of the back side of the carrier plate extend beyond the device housing and are externally exposed; and
a rounded transition portion disposed between the peripheral wall and the back side of the carrier plate.

17. The rearview device of claim 16, wherein the device housing includes a recess therein configured to receive a device support.

18. The rearview device of claim 16, further comprising:
a front element including a rounded front edge.

19. The rearview device of claim 16, further comprising:
an engagement wall configured to engage a fastening arrangement disposed on an inside surface of the device housing.

* * * * *